No. 673,731. Patented May 7, 1901.
O. F. SHEPARD, Jr.
ELECTRIC MOTOR CONTROLLER.
(Application filed Oct. 3, 1900.)

(No Model.) 3 Sheets—Sheet 3.

Witnesses
J. D. Thorne
L. M. Jones

Inventor
Oscar F. Shepard Jr.
by John Elias Jones,
his attorney.

THE NORRIS PETERS CO., PHOTO-LITHO., WASHINGTON, D. C.

UNITED STATES PATENT OFFICE.

OSCAR F. SHEPARD, JR., OF MADEIRA, OHIO, ASSIGNOR TO THE WARNER ELEVATOR MANUFACTURING COMPANY, OF CINCINNATI, OHIO.

ELECTRIC-MOTOR CONTROLLER.

SPECIFICATION forming part of Letters Patent No. 673,731, dated May 7, 1901.

Application filed October 3, 1900. Serial No. 31,821. (No model.)

*To all whom it may concern:*

Be it known that I, OSCAR F. SHEPARD, Jr., a citizen of the United States of America, and a resident of Madeira, in the county of Hamilton and State of Ohio, have invented certain new and useful Improvements in Electric-Motor Controllers, of which the following is a specification.

This invention relates to certain improvements in controllers for electric motors, and has for its object to provide a device of this character of a simple and inexpensive nature which shall be adapted for governing the action of the motor in such a way as to permit of safely and conveniently starting and stopping the motor without the exercise of great care on the part of the operator.

The invention consists in a controller comprising two sets of partial circuits connected, respectively, with different motor-windings, means included in the partial circuits of each set for varying the flow of current through said windings, and devices for inserting each set of partial circuits in its respective motor-circuit, the inserting devices for one set being controlled by the devices of the other set.

The invention also contemplates certain novel features of the combination and arrangement of the several parts of the improved controller whereby certain important advantages are attained and the device is made simpler, cheaper, and otherwise better adapted for use, all as will be hereinafter fully set forth.

The novel features of the invention will be carefully defined in the claims.

Figure 1:
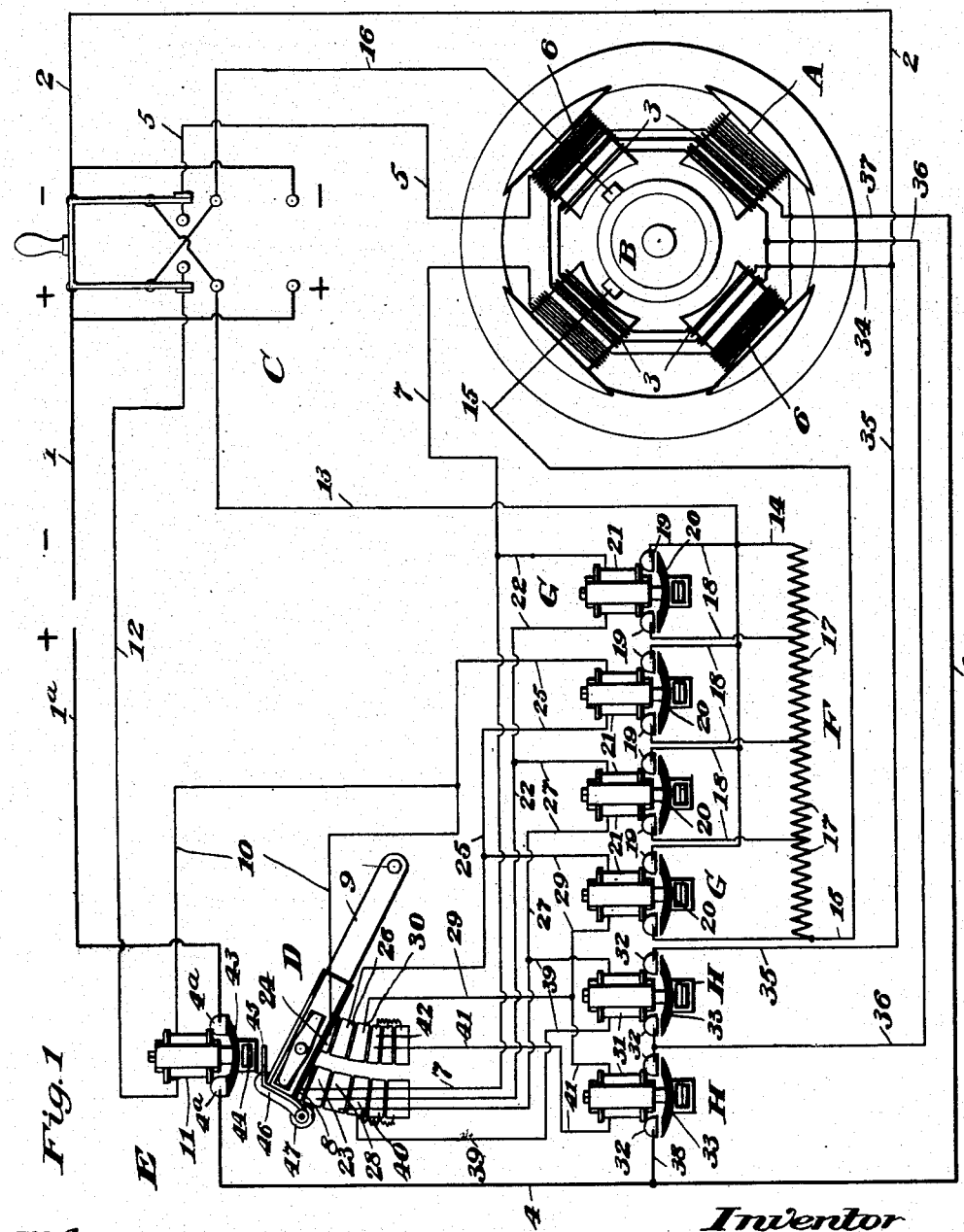
Figure 2:
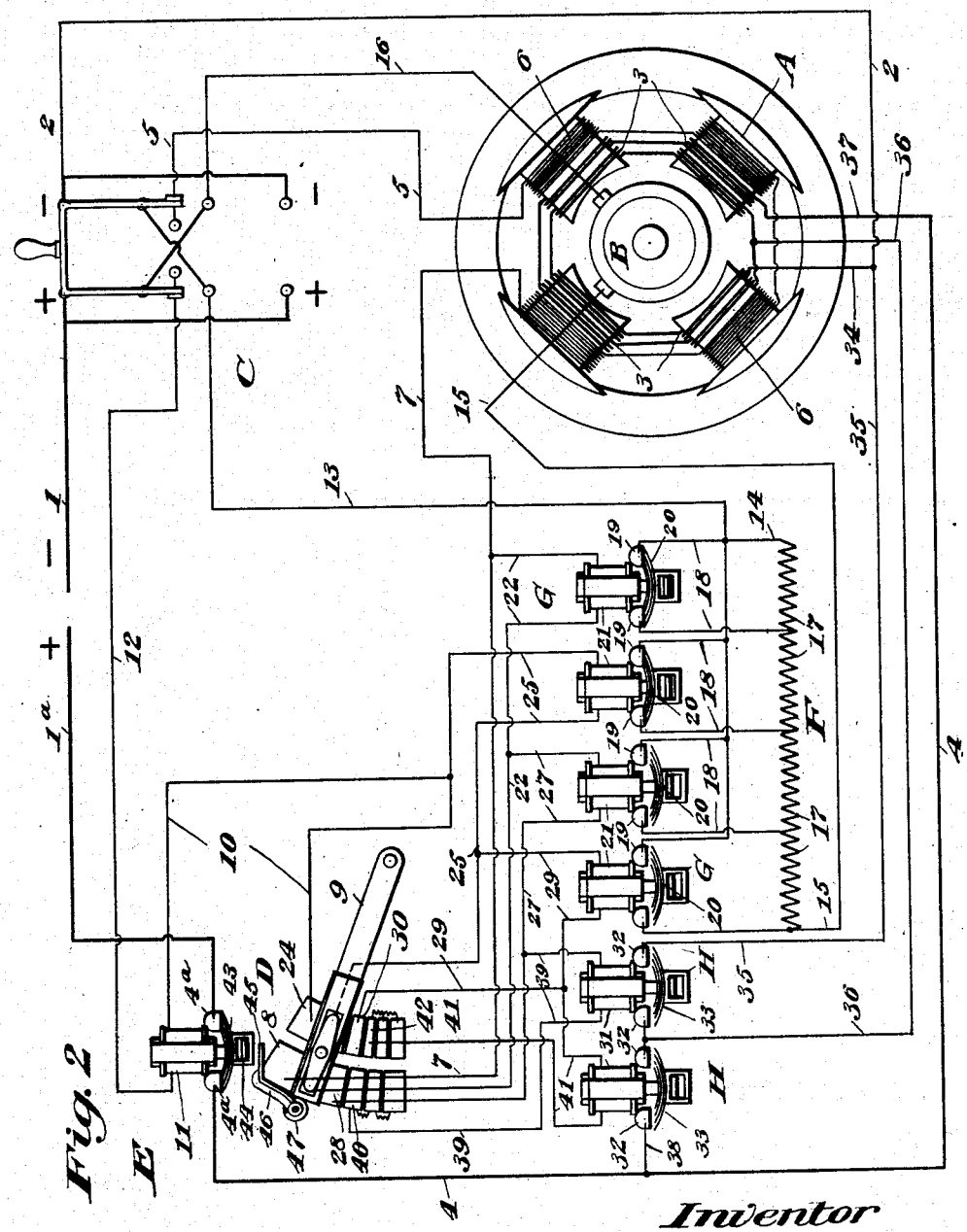
Figure 3:
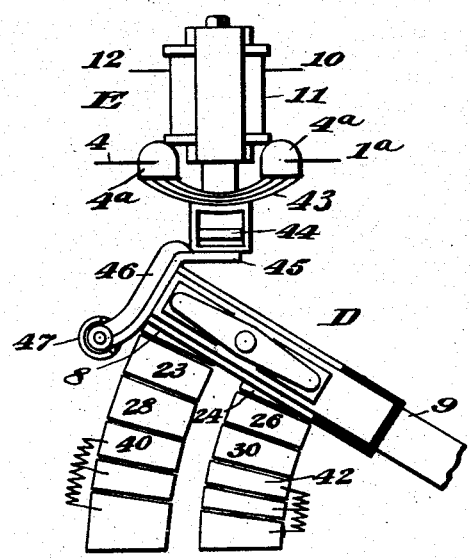
Figure 4:
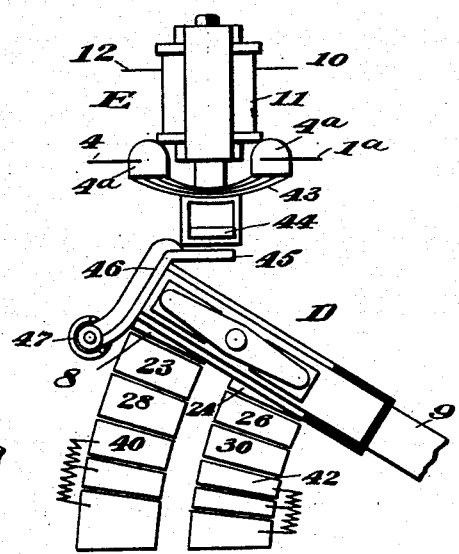
Figure 5:
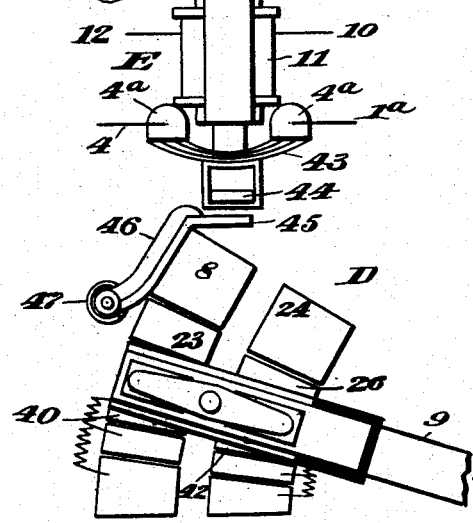
Figure 6:
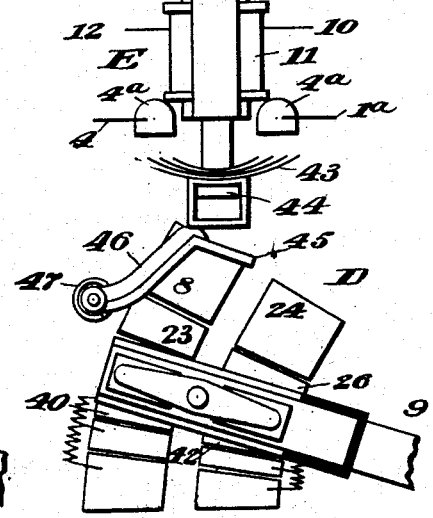

In the accompanying drawings, which serve to illustrate my invention, Figure 1 is a diagraphic view showing the various parts and connections of the improved controller, the parts being shown in the positions in which they stand when the circuits are open or at starting. Fig. 2 is a view similar to Fig. 1, but showing the condition of the several parts and connections after the circuits have been closed to start the motor. Fig. 3 is an enlarged detail view showing the safety device for cutting the feed-circuit in case of a temporary break or interruption therein, the parts being shown in the positions in which they stand at starting and before the motor-circuits have been closed. Fig. 4 is a view similar to Fig. 3, but showing the parts of the device in the positions in which they stand after the circuits have been closed at starting. Fig. 5 is a view similar to Figs. 3 and 4, but showing the parts of the device in the positions in which they stand after the circuits have been closed and the rheostat-arm lowered; and Fig. 6 is a view similar to Fig. 5, but showing the positions assumed by the parts in case of interruption of the feed-circuit during the operation of the motor.

As shown in the views, A indicates the field, and B the armature, of a reversible motor, and C indicates the reversing-switch employed in connection with said motor. D indicates the rheostat commonly arranged to be operated in unison with said reversing-switch.

E indicates the safety cut-out for holding the feed-circuit open when the current-supply has been interrupted.

F indicates the starting-resistance.

G G indicate the devices for cutting out the armature-resistance, and H H indicate similar devices for cutting out the series field-windings of the motor.

1 1[a] indicate the feed-conductors, one of which leads to the safety cut-out device E, which has two contact-points 4[a] 4[a], with one of which said feed-conductor is connected. The space or gap between said contacts is adapted to be bridged over in the operation of the device in a manner to be hereinafter described, so that normally the supply-circuit will be closed at the safety cut-out. From the other contact-point 4[a] of the cut-out E a conductor 4 leads to one terminal of the series windings 3 of the motor-field A, said windings 3 having their opposite terminal connected by a conductor 2 with the reversing-switch C. The switch C also has connection with the other feed-conductor 1. The reversing-switch C also affords connection by way of a conductor 5 with the shunt field-windings 6 of the motor, said shunt-windings having their opposite terminal connected by way of a conductor 7 with one of the upper contacts 8 for the arm or bar 9 of the rheostat D, the opposite contact 24 for said arm or bar being connected by a conductor 10 with the coils of a solenoid 11, forming the actuating means for the safety cut-out device E. From the coils of said solenoid a conductor 12 leads back to the reversing-switch C. The switch C also affords connection by way of conductors 13 and 14 with the armature-resistance F and through said resistance and by way of a conductor 15 with one brush of the armature B, the other brush for said armature being in connection through a conductor 16 with the reversing-switch C.

As shown in Figs. 1 and 2, the resistance F is for convenience in gradually reducing the resistance in the armature-circuit divided into four similar parts or sections 17, connected in series in the primary armature-circuit and each adapted to be cut out of said circuit by means of a shunt or partial circuit formed of wires or conductors 18 18, one of which extends from the conductor 13 to one contact-point 19 of the corresponding resistance cut-out device G, while the other extends from the opposite contact-point 19 of said device G to the part or section 17 of the resistance next in series. Each device G comprises a brush 20, adapted when moved to close the partial or shunt circuit between the contact-points 19 19, so as to cut out of the armature-resistance the corresponding section or part 17 of the resistance F, the brush 20 being carried on the core of a solenoid 21 or by an equivalent device, the coils of which are included in a partial or shunt circuit adapted for connection in series in the shunt field-circuit of the motor. These latter shunt or partial circuits for the shunt-field each have one terminal connected to a contact-point for the rheostat-bar 9, by which the devices G are controlled, while the other terminals are connected to one or the other of the wires or conductors 7 and 10 of the shunt field-circuit, the partial circuits being arranged alternately upon opposite sides of the rheostat D. The partial circuit for the first of the series of devices G includes wires or conductors 22, extended from the conductor 7 of the shunt-field to the solenoid 21 of said device and thence to the contact 23 next below the initial contact 8 of the rheostat-bar. For the second device G the partial or shunt circuit includes conductors 25, extended from the contact 26 of the rheostat next below the initial contact 24 to the solenoid 21 of that device and thence to the conductor 10 of the shunt-field, this partial circuit being on the side of the rheostat opposite to the partial circuit for the first device. The partial or shunt circuit for the third device of the series includes conductors 27, extended from one of the conductors 22 of the first partial circuit to the solenoid 21 of the third device and thence to the contact 28, below the contact 23 of the rheostat. The partial circuit for the fourth device includes conductors 29, extended from the rheostat-contact 30, below contact 26, to the solenoid of the device and thence to one of the conductors 25 of the second partial circuit. Thus it will be seen that the four devices, with their partial circuits, are divided into two sets, one set on each side of the rheostat D, and the circuits of each set are adapted to be connected through the rheostat in series with each other.

Devices H, similar to the devices G, are employed for controlling the series field-windings 3, of which windings two sets are shown herein, although this number, as well as the number of sections 17 of the starting-resistance F, may obviously be varied without departure from the principles of the invention. As herein shown, each of the devices H comprises two contact-points 32, a brush 33, and a solenoid 31 for moving the brush. One of said devices is included in a shunt or partial circuit formed of a conductor 35, leading from the conductor 2, which extends to one series winding 3, to one contact 32 of said device, and a conductor 36, leading from the other contact 32 of the device to a connection with the other field-winding 3 of the motor, and the other device H is included in a partial circuit formed of the conductor 36, affording connection between two contacts 32, one of each device H, and a conductor 38, extended from the other contact 32 of the last-named device H to the conductor 4, leading from the safety cut-out to the series field. Thus it will be seen that each of the partial circuits when closed is adapted to short-circuit one set of the series field-windings of the motor, and, further, the two partial circuits are also in series with each other similarly to those of the armature and shunt field circuits. The solenoids 31 for the devices H are also actuated from the shunt field-circuits, the first of said devices having the coils of its solenoid included in a partial circuit formed of conductors 39, extended from the conductors 27 of the third device G through the said coils and thence to the rheostat-contact 40 next below the contact 28, while the second device H has the coils of its solenoid included in a shunt or partial circuit, the conductors 41 of which extend from the rheostat-contact 42, next below the contact 30, to the circuit-conductor 29 of the fourth device G. Thus it will be seen that the partial circuits for the devices H form continuations or parts of the two sets or series of partial or shunt circuits for the devices G, being arranged one on one side and the other on the opposite side of the rheostat D.

The safety cut-out device E is constructed similarly to the cut-out devices G and H and comprises the contacts $4^a$ $4^a$ and solenoid 11, above referred to, together with a brush 43, adapted to bridge the gap or space between said contacts, being carried on the core of the solenoid and adapted to be held by said core when the solenoid is energized in close contact with said points, so as to close the circuit between said contact-points $4^a$. When the solenoid is deënergized by the interruption of the current-supply, the core is adapted to fall, carrying with it the brush 43, which being then out of contact with the points 4ª opens the supply-circuit between said points and holds it open until the brush shall have been again raised by means to be hereinafter described. To limit the downward movement of the core and brush, a stop 44 is provided, to be engaged by the brush, as shown in Fig. 6. A dog or detent 46 is also provided, being pivoted adjacent to the initial position of the rheostat-bar 9 when upon contacts 8 and 24 and being formed with a portion adapted to frictionally engage the end of said bar. A spring 47 is also provided, having engagement with the dog or detent 46 and of just sufficient tension to overcome the weight of said dog or detent, so as to hold the same raised, as shown in Figs. 1, 2, 3, 4, and 5 of the drawings, and to prevent the dog of itself from pressing upon the bar 9 with sufficient force to hold the bar against falling or moving downwardly. The dog 46 has a projecting portion 45, arranged to be engaged under the brush 43 on the solenoid-core, the arrangement being such that when the solenoid is deënergized, as at starting or when the current-supply is interrupted, the weight of both the solenoid-core and brush 43 rests upon said dog and tends to press the same downward against the tension of its spring 47.

When the rheostat or circuit-closing bar 9 is in raised position, as at starting, (see Figs. 1, 3, and 4,) its end has engagement with the dog or detent 46 and serves to prevent downward movement of the same against the tension of spring 47, so that when the parts are in this position the weight of the core and brush 43 will be supported and the brush will be held in contact with the contact-points 4ª of cut-out E. When the parts are in this position, the increased weight exerted by the core and brush upon the dog or detent will act to so increase the frictional engagement of the dog with bar 9 as to hold said bar in its initial position and prevent it from falling.

The brush 43 is formed by preference from elastic material—such as sheet brass or copper, for example—so that when the solenoid is energized its core, together with the said brush, may be raised sufficiently, the brush being flexed upon the contacts 4ª, so as to remove the weight of the core and brush from the pivoted dog 46, whereupon the frictional engagement between the dog and bar 9 will be either lessened or altogether eliminated, according to the tension of the spring 47, and the bar 7 will be free to fall and traverse its contacts.

When the rheostat-bar has fallen out of engagement with the dog 46, as shown in Figs. 5 and 6, the dog will still be supported by its spring 47, and while the current flows through the solenoid 11 the brush 43 will be held raised, as shown in Fig. 5; but in case the current-supply be interrupted when bar 9 is in lowered position the solenoid, being deënergized, will allow its core to fall, and the weight of the core and brush falling on or coming to bear on the dog 46, which is no longer supported by bar 9, will serve to press said dog down against the tension of its spring until the brush has been withdrawn from the contact-points 4ª and has engaged its stop 44, the flow of current through the cut-out E being thereby prevented until the bar 9 shall have been again raised to its initial position to again insert the starting-resistance in the armature-circuit.

In the operation of the improved controller when the switch C is actuated, the rheostat-bar 9 being in its initial position and the brush 43 being thereby held upon contacts 4ª, the shunt field-circuit will be completed through the solenoid 11, which by lifting the brush 43 will release the bar 9 from frictional engagement with dog 46, so as to permit said bar to fall, traversing its contacts, the current flowing through the cut-out E and traversing the series field and armature windings of the motor. As the bar 9 falls it acts to insert in the shunt-field the solenoid of the device G, controlling the first section 17 of the armature-resistance F, so as to insert the corresponding partial circuit in the armature-circuit and cut out the said resistance-section and at the same time to insert in the shunt-field a resistance corresponding to the coils of the solenoid 21 thus energized. As the bar continues to descend this action is repeated at each rheostat-contact until the entire resistance F is cut out of the armature-circuit and a resistance in the shape of the solenoids 21 is inserted in the shunt-field, and when this has been accomplished the farther descent of said bar 9 acts to successively insert in the shunt-field a further resistance by the inclusion of the solenoids 31, which by their action cut out the series windings of the motor-field.

The construction of the cut-out E is such that in case the current-supply is interrupted during the operation of the motor the supply-circuit is broken at the said cut-out and cannot be again completed except by raising the rheostat-bar 9 and again inserting the starting-resistance, so that accidents resulting from this cause are altogether prevented.

From the above description it will be seen that the improved controller is especially well adapted for use, particularly in connection with motors of large capacity, since the current in the shunt-field, which alone is handled by the circuit-closing arm 9, will be light compared with that of the armature and series field-circuit, and consequently dangerous sparking at the rheostat, such as would be unavoidable were the heavier current controlled by the same or an additional rheostat, will be avoided. The construction of the device is also simple and inexpensive, and it will be obvious that the improved controller is capable of considerable modification without material departure from the principles and spirit of the invention, and for this reason I do not wish to be understood as limiting myself to the precise form and arrangement of the several parts herein set forth, nor do I wish to be understood as limiting myself to the employment, in connection with the improved controller, of the cut-out device herein described, nor to the employment of the device in connection with reversible or series-wound motors, since by merely omitting the reversing-switch C and devices H, with the circuits therefor, the device may be made capable of use with other motors. When desired, also, the rheostat D may be dispensed with or replaced by some other form of circuit-closing device.

Having thus described my invention, what I claim, and desire to secure by Letters Patent, is—

1. In a controller for electric motors and the like, the combination of a partial circuit having means to include it in one motor-circuit, a resistance device connected with another motor-circuit, another partial circuit in shunt with the said resistance device and means, actuated from the closure of the first partial circuit, for including the last-named partial circuit in its motor-circuit, substantially as set forth.

2. A controller for electric motors and the like comprising two sets of partial circuits adapted for connection with different motor-circuits, means, included in the partial circuits of one set and in shunt with the partial circuits of the other set, for varying the flow of current through said motor-circuits, and devices for inserting each set of partial circuits in its respective motor-circuit, the inserting devices for one set of partial circuits being controlled from the devices of the other set, substantially as set forth.

3. A controller for electric motors and the like comprising two sets of partial circuits adapted for connection with different motor-circuits, resistance devices in shunt with the partial circuits for one motor-circuit, other resistance devices included in the partial circuits for the other motor-circuit and circuit-closing devices for the partial circuits, the circuit-closing devices for one set of partial circuits being controlled from the closure of the partial circuits of the other set, substantially as set forth.

4. In a controller for electric motors and the like, the combination of a resistance device connected with one motor-winding, a partial circuit in shunt with said resistance device, another partial circuit in shunt with another motor-winding and means for closing said partial circuits to cut out one motor-winding and the resistance device in the other motor-winding, substantially as set forth.

5. In a controller for electric motors and the like, the combination of a resistance device connected with one motor-winding, a partial circuit in shunt with said resistance device, another partial circuit adapted for connection in series with said motor-winding and in shunt with another motor-winding, and means to close said partial circuits, substantially as set forth.

6. A controller for electric motors and the like comprising three sets of partial circuits, connected, respectively, with different motor-windings, means, included in the partial circuits of one set and in shunt with the partial circuits of the other set, for varying the flow of current through two of said windings, the other set of partial circuits being in shunt with its windings and circuit-closing devices for the partial circuits, the circuit-closing devices for one set of partial circuits being arranged to control the circuit-closing devices for the other two sets of partial circuits, substantially as set forth.

7. In a controller for electric motors and the like, the combination of two sets of partial circuits adapted for connection with two motor-windings, resistance devices included in the partial circuits of one set, other resistance devices in shunt with the partial circuits of the other set, a third set of partial circuits in shunt with other motor-windings and means for closing all the partial circuits, substantially as set forth.

8. A controller for electric motors and the like comprising a rheostat-bar having contacts, partial circuits extended from said contacts and controlled from said bar and adapted to be included in one motor-circuit, solenoids included in said partial circuits resistance devices connected with another motor-circuit, partial circuits in shunt with said resistance devices and circuit-closing devices for the last-named partial circuits and controlled from said solenoids, substantially as set forth.

9. A controller for electric motors and the like comprising a rheostat-bar having contacts, partial circuits extended from said contacts and controlled from said bar and adapted to be placed in circuit with one winding of the motor, solenoids included in said partial circuits, other partial circuits in shunt with other motor-windings and circuit-closing devices for the last-named partial circuits and controlled from said solenoids, substantially as set forth.

10. A safety cut-out comprising a rheostat-bar and means for holding said bar against movement, said means being controlled by the movement of the rheostat-bar and actuated by the interruption of an electric current passed through it, substantially as set forth.

11. In a safety cut-out, the combination of a rheostat-bar, a dog adapted for engagement with said bar to hold the same against movement and a device controlled by the movement of the bar and actuated by the interruption of an electric current for holding the dog engaged with the bar, substantially as set forth.

12. In a safety cut-out, the combination of a rheostat-bar, a circuit-closing device, means for controlling the operation of the rheostat-bar from said circuit-closing device and means for controlling the operation of the circuit-closing device from the movement of the rheostat-bar, substantially as set forth.

13. In a safety cut-out, the combination of a rheostat-bar, a solenoid and a contact device controlled by the bar and solenoid and means for controlling the operation of the rheostat-bar from said contact device, substantially as set forth.

14. In a safety cut-out, the combination of a rheostat-bar, a solenoid, a contact device controlled by the bar and solenoid and controlling the flow of current through the solenoid and a dog actuated from the contact device for engagement with the bar to hold the same against movement, substantially as set forth.

15. In a safety cut-out, the combination of a rheostat-bar, a solenoid, a contact device controlled by said solenoid and controlling the flow of current through the solenoid and a dog arranged to be moved by said contact device when the solenoid is deënergized into position to hold the bar against movement, substantially as set forth.

16. In a controller for electric motors and the like, the combination of a shunt field-circuit, an armature-circuit and devices for simultaneously varying the current flow through said circuits inversely one to the other, the current-varying devices for the armature-circuit being controlled from the current-varying devices for the shunt field-circuit, substantially as set forth.

17. In a controller for electric motors and the like the combination of a shunt field-circuit, devices for varying the flow of current in said circuit, an armature-circuit, and devices actuated from the shunt field-circuit for varying the flow of current in the armature-circuit, the current-varying devices for one circuit being arranged for compensative operation relatively to those of the other circuit, whereby the flow of current in one circuit is increased as it is reduced in the other circuit, substantially as set forth.

18. In a controller for electric motors and the like, the combination of a shunt field-circuit, a series field-circuit, means for varying the flow of current in the shunt field-circuit and means, actuated from the current-varying means for the shunt field-circuit for similarly varying the magnetomotive force of the series field-circuit, substantially as set forth.

19. In a controller for electric motors and the like, the combination of a motor-circuit, a shunt field-circuit, means for varying the flow of current in the shunt field-circuit, means, actuated from the current-varying means for the shunt field-circuit, for varying the potential of the first-mentioned motor-circuit and a circuit-closing device controlling the operation of the current-varying means for the shunt field-circuit, substantially as set forth.

20. In a controller for electric motors and the like, the combination of a shunt field-circuit, an armature-circuit having a resistance, a plurality of solenoids controlling the said resistance and means for including said solenoids successively in the shunt field-circuit to cut the resistance out of the armature-circuit, substantially as set forth.

21. In a controller for electric motors and the like, the combination of a shunt field-circuit, a series field-circuit, a plurality of solenoids controlling the series field-circuit and means for including said solenoids successively in the shunt field-circuit to cut out the windings of the series field-circuit, substantially as set forth.

Signed at Cincinnati, Ohio, this 27th day of September, 1900.

OSCAR F. SHEPARD, JR.

Witnesses:
JOHN ELIAS JONES,
J. D. THORNE.